(12) United States Patent
Sarva et al.

(10) Patent No.: US 11,558,293 B2
(45) Date of Patent: *Jan. 17, 2023

(54) NETWORK CONTROLLER SUBCLUSTERS FOR DISTRIBUTED COMPUTE DEPLOYMENTS

(71) Applicant: Juniper Networks, Inc., Sunnyvale, CA (US)

(72) Inventors: Sreelakshmi Sarva, San Jose, CA (US); Nagendra Prasath Maynattamai Prem Chandran, Fremont, CA (US); Suresh Kumar Vinapamula Venkata, San Jose, CA (US); Richard Roberts, Rennes (FR)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/491,449

(22) Filed: Sep. 30, 2021

(65) Prior Publication Data

US 2022/0021611 A1 Jan. 20, 2022

Related U.S. Application Data

(63) Continuation of application No. 16/235,350, filed on Dec. 28, 2018, now Pat. No. 11,165,697.

(Continued)

(51) Int. Cl.
*H04L 45/64* (2022.01)
*H04L 12/46* (2006.01)
(Continued)

(52) U.S. Cl.
CPC .......... *H04L 45/64* (2013.01); *H04L 12/4633* (2013.01); *H04L 12/66* (2013.01); *H04L 45/04* (2013.01); *H04L 45/586* (2013.01)

(58) Field of Classification Search
CPC ......... H04L 41/12; H04L 45/42; H04L 12/66; H04L 45/04; H04W 36/22; H04W 76/10; H04W 40/24
See application file for complete search history.

(56) References Cited

U.S. PATENT DOCUMENTS 9,571,394 B1 2/2017 Sivaramakrishnan et al.
10,200,274 B1 2/2019 Suryanarayana et al.
(Continued)

FOREIGN PATENT DOCUMENTS

| CN | 105376297 A | 3/2016 |
|---|---|---|
| CN | 106685835 A | 5/2017 |
| WO | 2013/184846 | 12/2013 |

OTHER PUBLICATIONS

Communication pursuant to Article 94(3) EPC from counterpart European Application No. 19181704.8 dated Mar. 1, 2022, 5 pp.

(Continued)

*Primary Examiner* — Tonia L Dollinger
*Assistant Examiner* — Linh T. Nguyen
(74) *Attorney, Agent, or Firm* — Shumaker & Sieffert, P.A.

(57) ABSTRACT

The disclosure describes examples where a first data center includes a first gateway router, a first set of computing devices, and a second set of computing devices. The first set of computing devices is configured to execute a software defined networking (SDN) controller cluster to facilitate operation of one or more virtual networks within the first data center. The second set of computing devices is configured to execute one or more control nodes to exchange route information, between the first gateway router and a second gateway router of a second data center different than the first data center, for a virtual network between computing devices within the second data center, and to communicate control information for the second data center to the second (Continued)

set of computing devices, wherein the one or more control nodes form a subcluster of the SDN controller cluster.

19 Claims, 4 Drawing Sheets

Related U.S. Application Data

(60) Provisional application No. 62/768,412, filed on Nov. 16, 2018.

(51) Int. Cl.
*H04L 12/66* (2006.01)
*H04L 45/02* (2022.01)
*H04L 45/586* (2022.01)

(56) References Cited

U.S. PATENT DOCUMENTS

| | | | |
|---|---|---|---|
| 11,165,697 | B2 | 11/2021 | Sarva et al. |
| 2013/0044641 | A1 | 2/2013 | Koponen et al. |
| 2013/0058335 | A1 | 3/2013 | Koponen et al. |
| 2014/0181292 | A1 | 6/2014 | Venkataswami et al. |
| 2014/0244851 | A1 | 8/2014 | Lee |
| 2015/0071111 | A1* | 3/2015 | Tao .................. H04W 36/385 370/254 |
| 2015/0100560 | A1 | 4/2015 | Davie et al. |
| 2015/0124625 | A1 | 5/2015 | Aldrin et al. |
| 2015/0131989 | A1* | 5/2015 | Syed .................. H04Q 11/0066 398/45 |
| 2015/0131997 | A1 | 5/2015 | Syed et al. |
| 2015/0244617 | A1 | 8/2015 | Nakil et al. |
| 2015/0263946 | A1 | 9/2015 | Tubaltsev et al. |
| 2017/0012866 | A1 | 1/2017 | Balasubramanian et al. |
| 2017/0155681 | A1 | 6/2017 | Ashley et al. |
| 2017/0207994 | A1 | 7/2017 | Lin et al. |
| 2017/0317954 | A1* | 11/2017 | Masurekar ............ H04L 45/586 |
| 2018/0287965 | A1 | 10/2018 | Sindhu et al. |
| 2018/0359323 | A1 | 12/2018 | Madden |
| 2019/0036817 | A1 | 1/2019 | Suzuki et al. |

OTHER PUBLICATIONS

First Office Action and Search Report, and translation thereof, from counterpart Chinese Application No. 201910561565.X dated Feb. 28, 2022, 13 pp.

Response to Communication pursuant to Article 94(3) EPC dated Mar. 1, 2022, from counterpart European Application No. 19181704.8 filed Jun. 29, 2022, 20 pp.

Bates et al., "Multiprotocol Extensions for BGP-4," RFC 4760, Network Working Group, Jan. 2007, 12 pp.

Examination Report from counterpart European Application No. 19181704.8, dated Mar. 17, 2021, 4 pp.

Extended Search Report from counterpart European Application No. 19181704.8, dated Oct. 30, 2019, 8 pp.

Mirkhanzadeh et al., "SDxVPN: A Software-Defined Solution for VPN Service Providers," NOMS 2016—2016 IEEE/IFIP Network Operations and Management Symposium, Apr. 25-29, 2016, 9 pp.

Response to Examination Report dated Mar. 17, 2021 from counterpart European Application No. 19181704.8, filed Jul. 15, 2021, 10 pp.

Response to Extended Search Report dated Oct. 30, 2019 from counterpart European Application No. 19181704.8, filed Nov. 16, 2020, 10 pp.

Prosecution History from U.S. Appl. No. 16/235,350, dated Jun. 23, 2020 through Oct. 5, 2021, 118 pp.

* cited by examiner

NETWORK CONTROLLER SUBCLUSTERS FOR DISTRIBUTED COMPUTE DEPLOYMENTS

PRIORITY CLAIM

This application is a continuation of U.S. application Ser. No. 16/235,350, filed Dec. 28, 2018, which claims the benefit of U.S. Provisional Patent Application No. 62/768,412, filed Nov. 16, 2018, the entire contents of which are incorporated herein by reference.

TECHNICAL FIELD

The disclosure relates to computer networking.

BACKGROUND

In a typical cloud Data Center (DC) environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Multi-cloud environment refers to the use of multiple clouds for computing and storage services. An enterprise may utilize an on-premise computing and/or storage service (e.g., on-premises cloud), and one or more off-premise clouds such as those hosted by third-party providers. Examples of the clouds include private, public, or hybrid public/private clouds that allow for ease of scalability while allowing different levels of control and security. An enterprise may utilize one or more of private, public, or hybrid public/private clouds based on the types of applications that are executed and other needs of the enterprise.

SUMMARY

In general, the disclosure describes techniques for distributing network control for a set of compute nodes located at a remote location to a subcluster of nodes that is a subcluster of a Software-Defined Networking (SDN) controller cluster of nodes. The network controller cluster and the subcluster may be located in a primary data center, while the set of compute nodes controlled by the subcluster may be located in a remote data center. In some cases, the subcluster may be located in the remote data center. It may be advantageous to have a seamless method of managing a software-defined networking controller (such as a Contrail controller by Juniper Networks®, Tungsten Fabric, VMware® NSX®, IBM® SDN, Vyatta® by AT&T®, Cisco® SDN controller and Open SDN controller) to facilitate network communications among compute nodes (e.g., computing devices) across many geographically-distributed data centers efficiently and cost-effectively, particularly where such a controller should not be required at each site of the distributed data centers.

In some examples, the entire SDN controller cluster (e.g., full-fledged controller) executes on computing devices within a primary data center. The SDN controller cluster may facilitate operation of one or more virtual networks within the primary data center, and may further provide shared resources to facilitate operation of one or more virtual networks within other data centers (e.g., small, distributed data centers, also called remote data centers). At the primary data center, a set of the computing devices execute a first set of one or more control nodes that provide route information for virtual networks at a remote data center.

In this manner, the remote data center does not need a co-located SDN controller that would utilize limited compute resources because there may not be many computing devices in the remote data center. The route information handling can be performed at the primary data center by dedicated control nodes of the subcluster. Moreover, the primary data center executes the SDN controller cluster that provides shared resources for the other data centers for operations such as analytics and database management (e.g. global cluster configuration, contrail-analytics service, contrail-analytics-database service, etc.) so that remote data centers do not need to execute on limited compute resources analytics and database management operations. As used herein, contrail-analytics services may refer to, for example, an analytic service responsible for collecting, collating, and presenting analytics information for trouble shooting problems and for understanding network usage. As used herein, contrail-analytics-database service may refer to, for example, a database service (e.g., Cassandra) that is fault tolerant and horizontally scalable for persistent storage of analytics data.

The first set of one or more control nodes may form a subcluster of the SDN controller cluster and may be dedicated to one of the remote data centers. The primary data center may execute a plurality of sets of control nodes, where each set of control nodes is dedicated to respective ones of the remote data centers. In such a configuration, each set of control nodes may consolidate route distribution, and separately and independently facilitate operation of virtual networks of associated with the respective sets of control nodes. The techniques may provide a practical application of providing technical improvements to the management of virtual networks by subclustering the operations to promote management ease and reduce burden on computing devices of remote data centers that have limited compute resources.

In one example, the disclosure describes a system comprising a first data center. The first data center includes: a first gateway router; a first set of computing devices configured to execute a SDN controller cluster to facilitate operation of one or more virtual networks within the first data center; and a second set of computing devices configured to execute one or more control nodes to exchange route information, between the first gateway router and a second gateway router of a second data center different than the first data center, for a virtual network between computing devices within the second data center, and to communicate control information for the second data center to the second set of computing devices, wherein the one or more control nodes form a subcluster of the SDN controller cluster.

In another example, the disclosure describes a method including: executing, by a first set of computing devices, a SDN controller cluster to facilitate operation of one or more virtual networks within a first data center; and executing, by a second set of computing devices, one or more control nodes to exchange route information, between a first gateway router of the first data center and a second gateway router of a second data center different than the first data center, for a virtual network between computing devices within the second data center, and to communicate control information for the second data center to the second set of computing devices, wherein the one or more control nodes form a subcluster of the SDN controller cluster.

In one example, the disclosure describes a computer-readable storage medium storing instructions thereon that when executed cause one or more processors to: execute a SDN controller cluster to facilitate operation of one or more virtual networks within a first data center; and execute one or more control nodes to exchange route information, between a first gateway router of the first data center and a second gateway router of a second data center different than the first data center, for a virtual network between computing devices within the second data center, and to communicate control information for the second data center to the second set of computing devices, wherein the one or more control nodes form a subcluster of the SDN controller cluster.

The details of one or more examples are set forth in the accompanying drawings and the description below. Other features, objects, and advantages will be apparent from the description and drawings, and from the claims.

DETAILED DESCRIPTION

Figure 1:
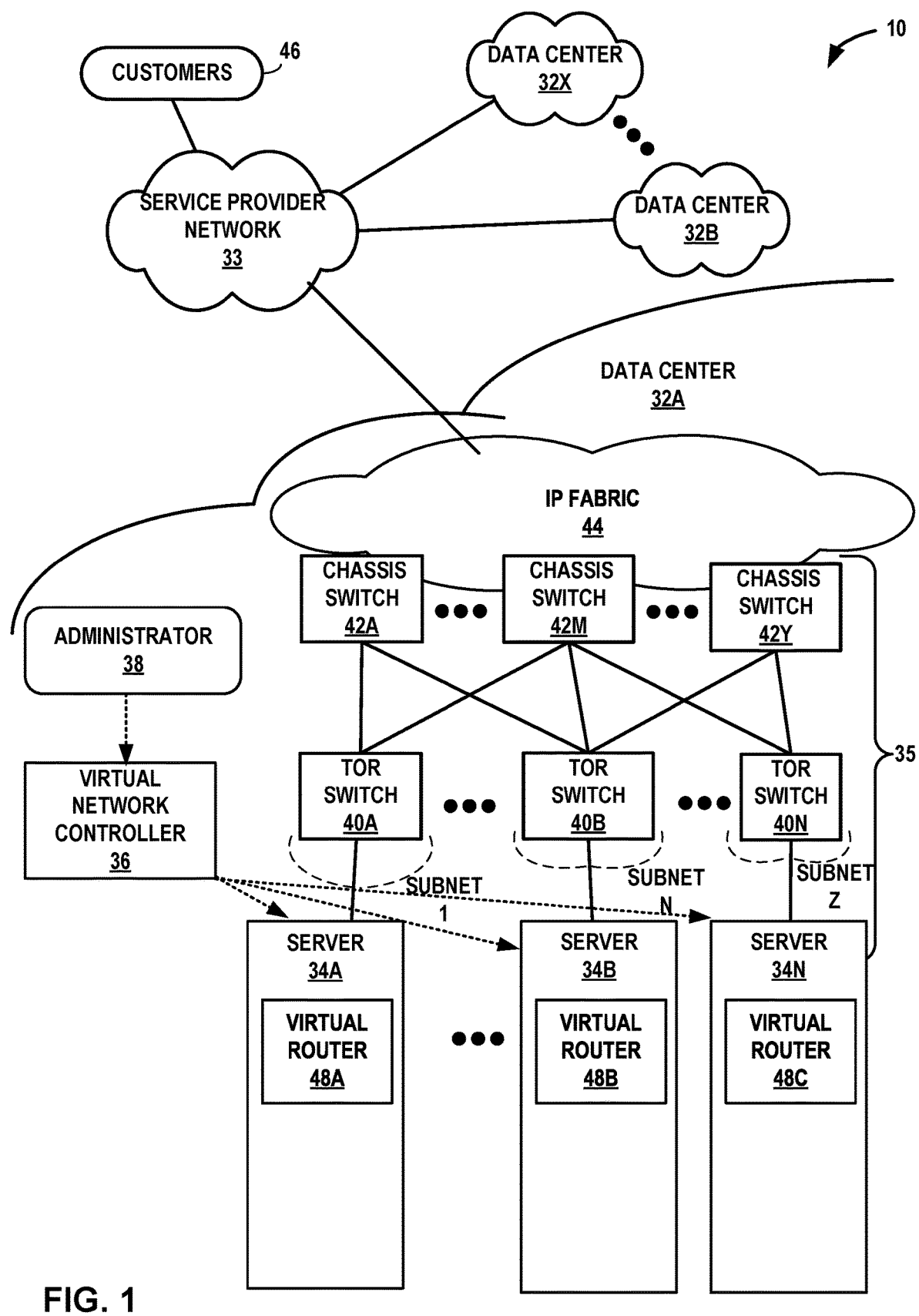
FIG. 1 is a block diagram illustrating an example multi-data center system having a data center in which examples of the techniques described herein may be implemented.

FIG. 1 is a block diagram illustrating an example multi-data center system having a data center in which examples of the techniques described herein may be implemented. FIG. 1 illustrates data centers 32A-32X (collectively, "data centers 32"), which house servers (also called computing devices, computes, or compute nodes). As one examples, data center 32A houses servers 34A-34N (collectively, "servers 34", also called "computing devices 34A-34N") that may be configured to provide the infrastructure for virtual networks for communication. As shown, each server of servers 34 may include a respective virtual router of virtual routers 48A-48C (collectively, "virtual routers 48" or simply "vRouters 48"). Virtual routers 48 may represent software routers of physical servers coupled to a switch fabric to extend the switch fabric.

The other data centers 32B-32X may be similar to data center 32A, but there may be certain differences. For example, the other data centers 32B-32X may be smaller size data centers in the sense that one or more of the other data centers 32 have limited computation resources.

As illustrated data centers 32A-32X are interconnected with one another and with customer networks associated with customers 46 via a service provider network 33. In general, each data center 32A provides an operating environment for applications and services for customers 46 coupled to the data center by service provider network 33. Data centers 32 may, for example, host infrastructure equipment, such as networking and storage systems, redundant power supplies, and environmental controls. Service provider network 33 may be coupled to one or more networks administered by other providers and may thus form part of a large-scale public network infrastructure, e.g., the Internet. In other examples, service provider network 33 may be only coupled to one or more networks administered by a single provider and may thus form part of a backbone network infrastructure.

In some examples, each data centers 32 may represent one of many geographically distributed network data centers. As illustrated in the example of FIG. 1, each of data centers 32 may represent a facility that provides network services for customers 46. Customers 46 may be collective categories such as enterprises and governments or individuals. For example, a network data center may host a virtual computing environment (e.g., cloud) that provides web services for several enterprises and end users. Other exemplary services may include data storage, virtual private networks, traffic engineering, file service, data mining, scientific- or super-computing, and so on. In some examples, each of data centers 32 may be individual network servers, network peers, or otherwise.

In the illustrated example, each of data centers 32 includes a set of servers 34A-34N (herein, "servers 34") interconnected via high-speed switch fabric 35 provided by one or more tiers of physical network switches and routers. Switch fabric 35 is provided by a set of interconnected Top-Of-Rack (TOR) switches 40A-40N (collectively, "TOR switches 40") coupled to a distribution layer of chassis switches 42A-42Y (collectively, "chassis switches 42"). Although not shown, each of data centers 32 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 40 and chassis switches 42 provide servers 34 with redundant (multi-homed) connectivity to IP fabric 44 and service provider network 33. Chassis switches 42 aggregate traffic flows and provides high-speed connectivity between TOR switches 40. TOR switches 40 may be network devices that provide layer two (e.g., MAC) and/or layer 3 (e.g., IP) routing and/or switching functionality. TOR switches 40 and chassis switches 42 may each include one or more processors and a memory, and that are capable of executing one or more software processes. Chassis switches 42 are coupled to IP fabric 44, which performs layer 3 routing to route network traffic between data centers 32 and customers 46 by service provider network 33.

Virtual Network Controller 36 ("VNC") is an example of a SDN controller implemented on a cluster. VNC 36 (also called SDN controller cluster 36) provides a logically and in some cases physically centralized controller for facilitating operation of one or more virtual networks within data center 32A. In some examples, virtual network controller 36 may operate in response to configuration input received from network administrator 38. Administrator 38 may represent an operator, developer, or application deployment specialist that uses a common interface to create and deploy virtual computing environment topologies to virtualized network controller 36 for provisioning within the computing infrastructure. Additional information regarding virtual network controller 36 operating in conjunction with other devices of data center 32A or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226, 509, filed Mar. 26, 2014, and entitled "Tunneled Packet Aggregation for Virtual Networks," each which is incorporated by reference as if fully set forth herein.

In some examples, the traffic between any two network devices, such as between network devices within IP fabric 44 (not shown), between servers 34, and customers 46, or between servers 34, for example, can traverse the physical network using many different paths. A packet flow (or "flow") can be defined by the five values used in a header of a packet, or "five-tuple," i.e., the protocol, source IP address, destination IP address, source port and destination port that are used to route packets through the physical network. For example, the protocol specifies the communications protocol, such as TCP or UDP, and source port and destination port refer to source and destination ports of the connection.

A set of one or more Packet Data Units (PDUs), or packets, that include a packet header specifying a particular five-tuple represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port. A flow may be additionally or alternatively defined by an Application Identifier (AppID) that is determined by a virtual router agent or other entity that identifies, e.g., using a port and protocol list or Deep Packet Inspection (DPI), a type of service or application associated with the flow in that the flow transports application data for the type of service or application.

A difference between data center 32A and the other data centers 32 may be that data center 32A provides higher levels of computing resources than the other data centers 34. There may be technical problems by having each one of data centers 34 execute its own corresponding virtual network controller (e.g., full-fledged SDN controller cluster) due to the limitations on computing resources. However, there may still be a need to form localized, independently controlled virtual networks within the other data centers 34. This disclosure describes example techniques to form subclusters of control nodes within a data center having high-levels of computing resources (e.g., data center 32A) that can separately and independently manage the virtual networks on other data centers 32. For other operations needed to manage the virtual networks such as gathering analytics data and database management, the computing devices (e.g., servers 34) may provide shared resources that can be used for analytics and database management, as well as other tasks, for the virtual networks of the other data centers 34.

For example, one or more data centers 32B-32X may be unable to execute a full-fledged SDN controller. However, communication tunnels between the computing devices of one or more data centers 32B-32X may still need to be established. One way to establish such tunnels would be with a single virtual network controller on data center 32A that establishes the communication tunnels for the computing devices within data center 32A and communication tunnels for the computing devices in one or more of the remote data centers (e.g., one or more of data centers 32B-32X). However, there may be technical problems in such a configuration.

Configuring a system with a single control node to control a local cluster (e.g., computing devices of data center 32A) and multiple remote clusters (e.g., computing devices of one or more of data centers 32B-32X) may result in undesirable routes being formed between remote clusters. For example, a high performance backbone (e.g., 1000's MB/S) may connect the local cluster to each remote cluster. However, another network (e.g., internet) may connect the remote clusters to each other that is slower (e.g., 10's of MB/S) than the high performance backbone. In this example, when the single control node receives routes from each remote cluster, the single control node transmits all of the routes to all clients, including vRouters of other remote clusters. As such, the vRouters of each of the remote clusters may be configured with undesirable routes that transmit data to other remote clusters, which is then transmitted to the high performance backbone. These undesirable routes reduce a performance (e.g., throughput, latency, etc.) of the network, and potentially impact reliability. Moreover, as the number of vRouters and/or remote clusters increases, the number of undesirable routers may also increase, which may result in too many communication links. Accordingly, the undesirable routes may add complexity to the routing systems of the remote clusters.

This disclosure describes examples techniques that provision virtual network controller 36 to include multiple control nodes. A first subcluster of control nodes may be associated with a first remote data center, a second subcluster of the control nodes may be associated with a second remove data center, and so forth. As described in more detail, each control node may establish communication tunnels between computing devices of the remote data center with which a respective control node is associated. In this manner, the techniques prevent subclusters from directly peering with other subclusters to limit communication links that are available to the remote center. For example, links between vRouters at a data center may be limited to routes that are only available within the data center, and routes that cause data to be transmitted to another data center associated with another subcluster of control nodes are removed as possible routes. With a single control node, such isolation may not be available resulting in negative impact on latency, throughput, and reliability.

The following describes some examples of such subclustering to allow for remote control of the virtual networks. This disclosure describes example techniques with subclustering represents individual remote sites where only compute node services and control nodes are spawned, and Internal Border Gateway Protocol (iBGP) meshed among themselves. These control nodes are provisioned to BGP peer with SDN gateway, over which route exchange with primary control nodes happen.

When applying iBGP forwarding rules, all virtual routers, which may be Route Reflector (RR) clients, may transmit routes only to a RR. In this example, the RR can receive the routes from any of the clients and can transmit received routes to all clients (except the vRouter from where the routes came) and to all non-client iBGP neighbor. In this example, a SDN gateway can transmit routes to a control node (e.g., RR) and these routes will be subsequently transmitted by RR to all clients. However, a single control node for multiple remote data centers may cause a control node (e.g., RR) to create routes from an SDN gateway and then transmit the routes down to all clients (e.g., all vRouters in the remote data centers). As such, data center 32A may be configured to separate control nodes per remote data center using subclusters to prevent routes from being generated between data centers 32B-32X.

Compute nodes in the remote site may be provisioned to connect to these control nodes to receive config and exchange routes (e.g. virtual networks configuration and virtual machine interfaces routes attached to this virtual network, routing instances, forwarding policies, etc.). Data communication among workloads between these clusters happen through providers backbone through their respective SDN gateways. Both compute nodes are, and control nodes may be provisioned to push analytics data to analytics nodes hosted on primary cluster. The control nodes may be separated out to handle each of the remote subclusters but analytics and database management can be controlled for all subclusters with the analytics and database management nodes executing in the primary center. Therefore, route establishment and communication tunnels may be handled separately by the different control nodes, but other operations needed to formulate a proper operating virtual network such as analytics and database management can be shared resources.

As described above, distributed compute may extend SDN management and control (e.g., a mechanism to create and manage virtual networks) to many small distributed data centers, up to hundreds or even thousands, for telecommunications Point-of-Presence (PoPs) or Central Offices (COs). Each small data center (e.g., data centers 32 other than data center 32A) may have only a small number of computes (e.g., servers or computing devices), typically 5-20 in a rack, running a few applications such as video caching, traffic optimization, and virtual Broadband Network Gateway (vBNG). It may not be cost effective to deploy a full SDN controller cluster (e.g., full virtual network controller 36 having Control, Configuration, Analytics, database functionality) of nodes of control, configuration, analytics, database, and the like, in each distributed PoP on dedicated servers. Additionally, manually managing hundreds or thousands of clusters may not be feasible operationally.

Distributed/remote compute may be implemented by using a subcluster that manages compute nodes at remote sites to receive configurations and exchange routes. For example, a remote compute (e.g., executed at data center 32A) employs a subcluster to manage remote compute nodes (e.g., in data centers other than data center 32A) away from the primary data center (e.g., data center 32A is an example of the primary data center).

In some examples, a SDN controller control cluster (e.g., virtual network controller 36) is deployed in large centralized data centers (e.g., data center 32A), where the SDN controller cluster can remotely manage compute nodes in small distributed small data centers. In some examples, no control nodes execute on remote data centers, but in other examples, one or more control nodes may execute on one or more of the remote data centers. In some examples, a lightweight version of virtual network controller 36 may be created, limited to the control node, (at one or more of data centers 32B-32X) and the config node, analytics, and analytics database (executed by virtual network controller 36) may be shared across several control nodes. There may be co-location of many lightweight controllers on a small number of servers to optimize efficiency and cost. Many lightweight controllers can be co-located on a small number of servers to optimize efficiency and cost. The control nodes (executed by virtual network controller 36) may peer with the remote compute nodes (executed by one or more of data centers 32B-32X) using eXtensible Messaging and Presence Protocol (XMPP) and may peer with local gateways using Multi-Protocol extended Border Gateway Protocol (MP-eBGP).

Virtual network controller 36 may be configured to create a subcluster object. As used herein, a subcluster may refer to an object created for each remote site (data centers 32B-32X), with a list of links to local compute nodes that are represented as virtual router (vRouter) objects, and a list of links to local control nodes that are represented as BGP router objects, with an Autonomous System Number (ASN) as a property.

In some examples, the subclusters are identified in the provision script. The vRouter and BGP-router provision scripts may take each subcluster as an optional argument to link or delink with the subcluster object. The control nodes of the remote cluster may spawn in the primary cluster, and they are iBGP-meshed among themselves within that subcluster. The control nodes BGP-peer with their respective gateway (e.g., an SDN gateway), over which route exchange occurs with the primary control nodes.

Compute nodes in the remote site may be provisioned to connect to their respective control nodes to receive configuration and exchange routes. Data communication among workloads between these clusters occurs through the provider backbone (e.g., IP fabric 44) and their respective SDN gateways. The compute nodes and the control nodes can push analytics data to analytics nodes hosted on the primary cluster. For example, virtual network controller 36 may process analytics data for control nodes at executed by one or more of data centers 32B-32X.

The following describes subcluster properties. The SDN controller UI (e.g., virtual network controller 36) shows a list of subcluster objects, each with a list of associated vRouters and BGP routers that are local in that remote site and the ASN property. General properties of subclusters may include, but are not limited to, one or more of: (1) a subcluster control node never directly peers with another subcluster control node or with primary control nodes; (2) a subcluster control node has to be created, and is referred to, in virtual-router and BGP-router objects; (3) a subcluster object and the control nodes under it should have the same ASN; and/or (4) the ASN cannot be modified in a subcluster object.

Figure 2:
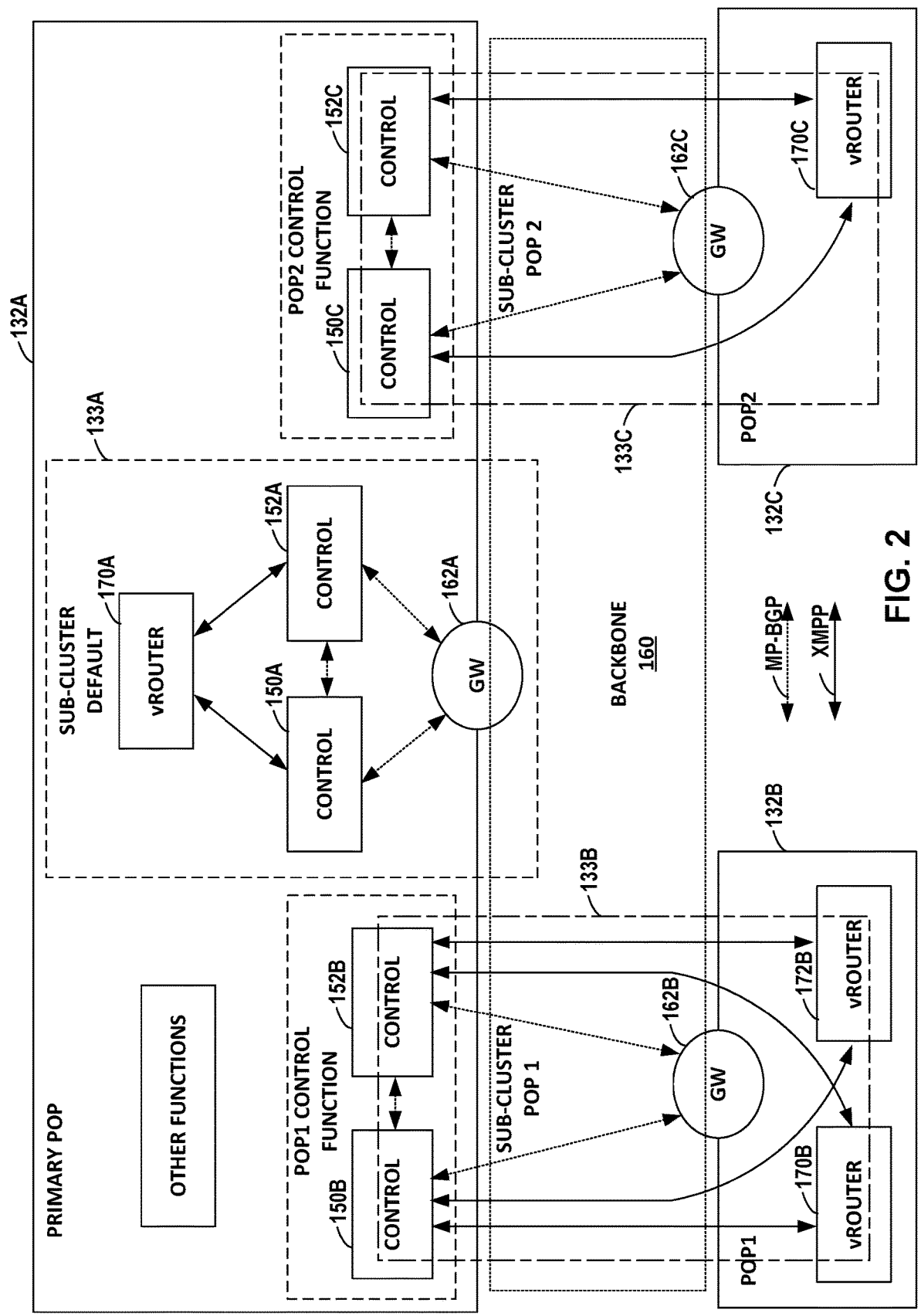
FIG. 2 is a block diagram illustrating another example multi-data center system having a data center in which examples of the techniques described herein may be implemented.

FIG. 2 is a block diagram illustrating another example multi-data center system having a data center 132A in which examples of the techniques described herein may be implemented. In this example, there is one main data center 132A (also referred to herein as "pop0 132A") and two remote data centers, data center 132B (also referred to herein as "pop1 132B") and data center 132C (also referred to herein as "pop2 132C"). Pop0 132A includes a subcluster default 133A and two remote subclusters, subcluster 133B for pop1 132B, and subcluster 133C for pop2 132C (collectively, "subclusters 133"). As used herein, a subcluster may refer to an object created for each remote site (e.g., data centers 132B, 132C), with a list of links to local compute nodes that are represented as virtual router (vRouter) objects, and a list of links to local control nodes that are represented as BGP router objects, with an ASN as property.

Data Center 132A is an example of data center 32A of FIG. 1. Data Center 132B and data center 132C are examples of data centers 32B-32X of FIG. 1. Backbone 160 is an example of service provider network 33 of FIG. 1. As shown backbone 160 includes gateways 162A, 162B, 162C (collectively, "gateways 162"). In some examples, one or more of gateways 162 may be SDN gateways. For example, gateway 162A may comprise an SDN gateway router communicatively coupled to computing devices of data center 132A.

In the example of FIG. 2, subcluster 133A includes control node 150A, subcluster 133B includes control node 150B, and subcluster 133C includes control node 150C (collectively, "control nodes 150"). In this example, subcluster 133A includes control node 152A, subcluster 133B includes control node 152B, and subcluster 133C includes control node 152C (collectively, "control nodes 152"). Control nodes 150, 152 may communicate using iBGP (e.g., MP-BGP). For example, control nodes 150B, 152B may communicate with each other through iBGP. In some examples, control nodes 150B, 152B that form subcluster pop1 133B are configured to border gateway protocol (BGP)-peer with gateway 162B (e.g., an SDN gateway router), over which route exchange occurs with control nodes 150B, 152B.

As shown, control nodes 150A, 152A may control virtual router 170A (also referred to herein simply as "vRouter 170A," which is implemented by a compute or computing device (e.g., one or more of servers 34 of FIG. 1). As shown, control nodes 150B, 152B may control vRouters 170B, 172B. In this example, control nodes 150B, 152B may control vRouter 170C. Control nodes 150, 152 may be configured to utilize XMPP to communicate route information with the second set of computing devices.

Communication between the control nodes within a subcluster and the remote data center may be through a SDN Gateway; there may be no direct connection (e.g., for consolidation of the routes) between each one of control nodes 150, 152. For example, communication between control nodes 150B, 152B communicate with vRouters 170B, 172B through gateway 162B. Similarly, communication between control nodes 150C, 152C communicate with vRouter 170C through gateway 162C. As shown, control nodes 150, 152 may peer with vRouters 170B, 172B, 170C using XMPP (extensible messaging and presence protocol) and may peer with gateways 162 using MP-eBGP (multi-protocol extended Border Gateway Protocol). MP-eBGP may be defined in IETF RFC 4760.

In accordance with techniques described herein, data center 132A includes a first set of computing devices configured to execute a SDN controller cluster to facilitate operation of one or more virtual networks within data center 132. For example, data center 132A includes one or more servers configured to execute subcluster default 133A to facilitate operation for a virtual network between one or more computing devices within data center 132A represented as vRouters 170A.

In this example, data center 132A includes a second set of computing devices configured to execute one or more control nodes to exchange route information, between the first gateway router and a second gateway router of a second data center different than the first data center, for a virtual network between computing devices within the second data center, and to communicate control information for the second data center to the second set of computing devices, where the one or more control nodes form a subcluster of the SDN controller cluster. As used herein, route information may include the IP addresses and information indicating the communication tunnels between different computing devices at a data center. Control information may instruct a vRouter how to communicate with a virtual machine and how route information may be sent to the vRouter using XMPP. Control information may also include information about how the communication tunnels are formed between compute devices at a data center, and this information is communicated using BGP.

For example, data center 132A includes one or more servers configured to execute control nodes 150B, 152B to exchange route information (e.g., IP addresses, communication tunnels, etc.), between gateway router 162A and gateway router 162B, for a virtual network represented as vRouters 170B, 172B, and to communicate control information (instructions to use one or more (optimal) particular paths of the route information) for data center 132B to the second set of computing devices, where control nodes 150B, 152B form a subcluster of the SDN controller cluster of data center 132A. In some examples, one or more of the first set of computing devices are part of the first set of computing devices. For example, a computing device (e.g., a server) may execute control nodes 150A, 152A and may execute control nodes 150B, 152B.

In the example of FIG. 2, a third set of computing devices are configured to execute a second set of one or more control nodes to exchange route information, between the first gateway router and a third gateway router of a third data center different than the first data center and the second data center, for a virtual network between computing devices within the third data center, and to communicate control information for the third data center to the third set of computing device, where the second set of one or more control nodes form a second subcluster of the SDN controller cluster. For example, a third set of computing devices are configured to execute control nodes 150C, 152C to exchange route information (e.g., IP addresses, communication tunnels, etc.), between gateway router 162A and gateway router 162C, for a virtual network represented as vRouter 170C, and to communicate control information (instructions to use one or more particular paths of the route information) for data center 132C to the second set of computing devices, where control nodes 150C, 152C form a subcluster of the SDN controller cluster of data center 132A.

Data center 132A may include a plurality of computing devices (e.g., servers). For example, data center 132A may include a plurality of sets of computing devices, each set of computing devices configured to execute respective one or more control nodes to exchange route information for a respective virtual network between computing devices within a respective data center that is different from the first data center. For example, data center 132A may include a first set of computing devices configured to execute control nodes 150A, 152A, a second set of computing devices configured to execute control nodes 150B, 152B, and a third set of computing devices configured to execute control nodes 150C, 152C.

In some examples, a first set of computing devices of data center 132A are configured to execute an SDN controller cluster to provide shared resources to facilitate operation of one or more virtual networks within data center 132B and/or data center 132C. For example, to provide shared resources to facilitate operation of one or more virtual networks within a plurality of other data centers, one or more of the first set of computing devices may be configured to perform analytics operation for one or more virtual networks within data center 132B and/or data center 132C.

Figure 3:
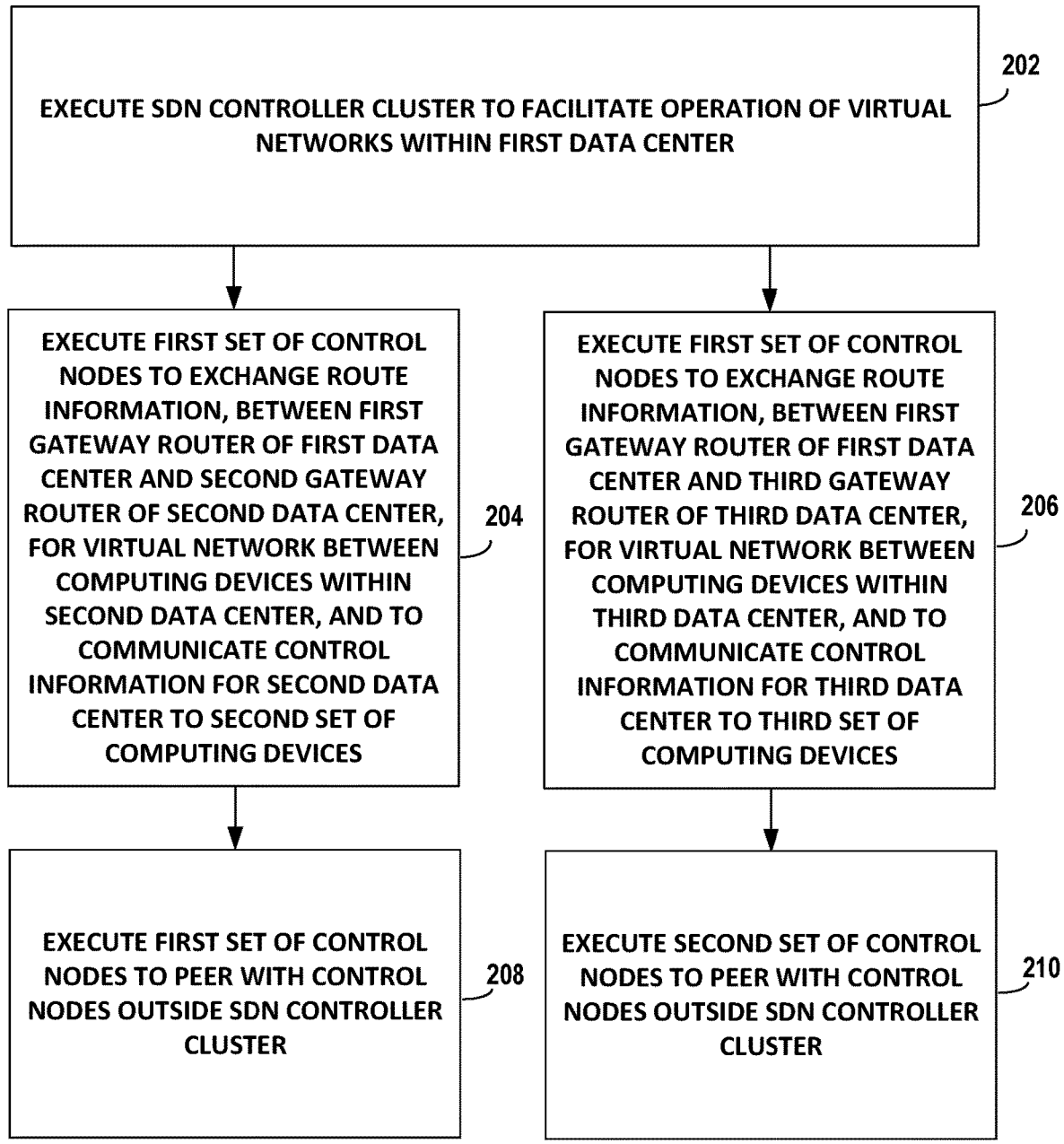
FIG. 3 is a flow chart illustrating an example process for control for a subcluster.

FIG. 3 is a flow chart illustrating an example process for control for a subcluster. In the example of FIG. 3, a first set of computing devices of data center 132A are configured to execute a SDN controller cluster to facilitate operation of one or more virtual networks within the first data center (202). For example, servers 34 of data center 132A are configured to execute control nodes 150A, 152A to facilitate operation of vRouter 170A.

A second set of computing devices are configured to execute a first set of control nodes to exchange route information, between the first gateway router and a second gateway router of a second data center different than the first data center, for a virtual network between computing devices within the second data center, and to communicate control information for the second data center to the second set of computing devices, where the first set of control nodes form a subcluster of the SDN controller cluster (204). For example, servers 34 of data center 132A are configured to execute control nodes 150B, 152B to exchange route information, between gateway router 162A and gateway router 162B, for vRouters 170B, 172B, and to communicate control information for data center 132B to vRouters 170B, 172B.

A third set of computing devices are configured to execute a second set of control nodes to exchange route information, between the first gateway router and a third gateway router of a third data center different than the first data center, for a virtual network between computing devices within the third data center, and to communicate control information for the third data center to the third set of computing devices, where the second set of control nodes form a subcluster of the SDN controller cluster (206). For example, servers 34 of data center 132A are configured to execute control nodes 150C, 152C to exchange route information, between gateway router 162A and gateway router 162C, for vRouter 170C and to communicate control information for data center 132C to vRouter 170C.

The second set of computing devices execute the first set of control nodes to peer with control nodes outside of cluster (208). For example, when applying iBGP forwarding rules, control nodes 150B, 152B may transmit routes from vRouters 170B, 172B only to control nodes outside of control nodes 150, 152 (e.g., outside of the SDN controller cluster). The third set of computing devices execute the third set of control nodes to peer with control nodes outside of cluster (210). For example, when applying iBGP forwarding rules, control nodes 150C, 152C may transmit routes from vRouter 170C only to control nodes outside of control nodes 150, 152 (e.g., outside of the SDN controller cluster). In this way, control nodes 150B, 152B and/or control nodes 150C, 152C never directly peer with another subcluster control node or with primary control nodes.

Figure 4:
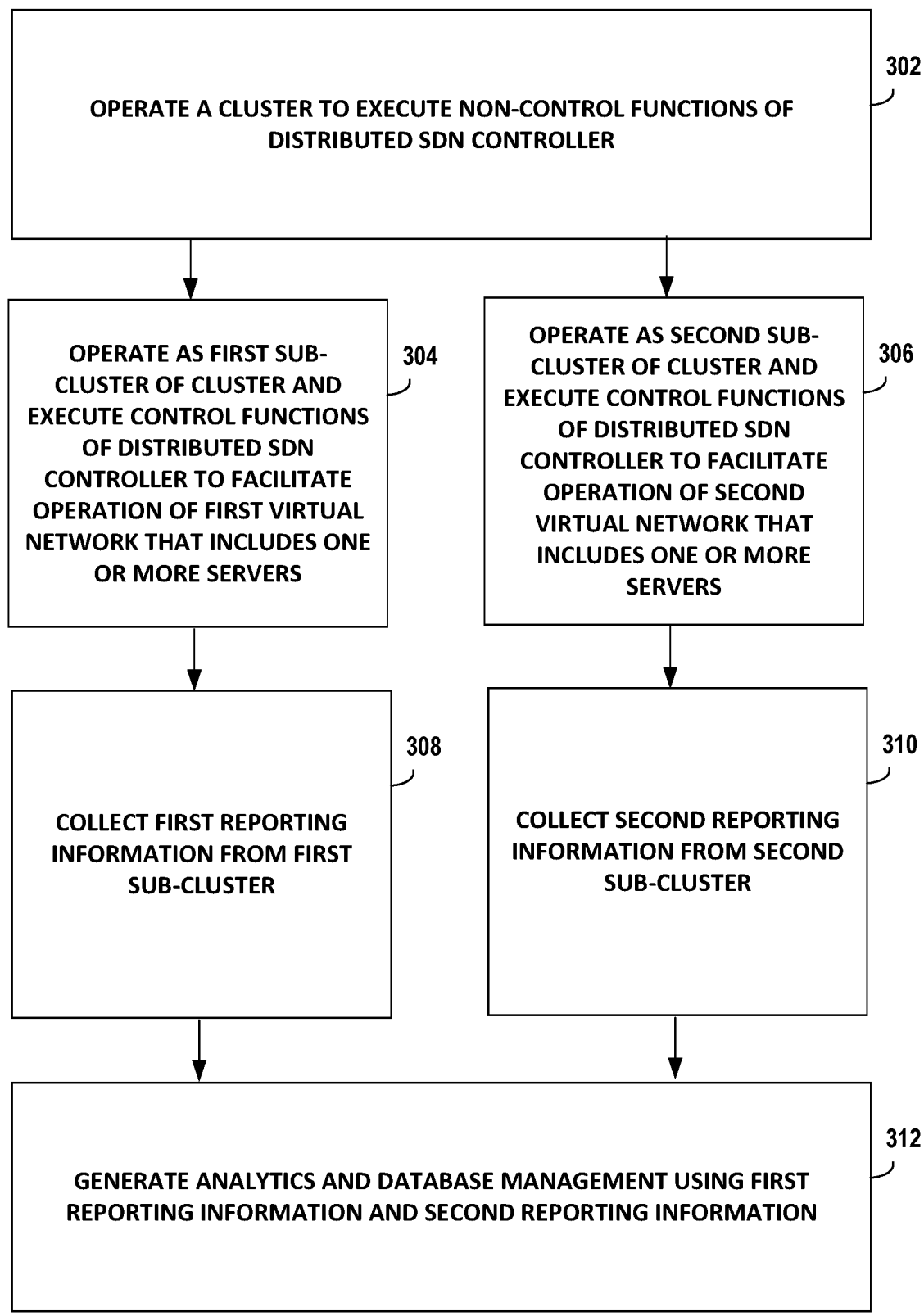
FIG. 4 is a flow chart illustrating an example process of operating a subcluster to execute control functions of a distributed SDN controller.

FIG. 4 is a flow chart illustrating an example process of operating a subcluster to execute control functions of a distributed SDN controller. A first set of computing devices of data center 132A are configured to operate as a cluster to execute non-control functions of a distributed SDN controller (302). For example, servers 34 of data center 132A may be provisioned to operate as a distributed SDN controller as illustrated in FIG. 2.

A second set of computing devices of data center 132A are configured to operate as a first subcluster of the cluster and to execute control functions of the distributed SDN controller to facilitate operation of a first virtual network that includes one or more servers (304). For example, servers 34 of data center 132A may be configured to operate as control nodes 150B, 152B to generate instructions to use one or more optimal paths of route information to facilitate operation of vRouters 170B, 172B.

The second set of computing devices of data center 132A are configured to operate as a second subcluster of the cluster and to execute control functions of the distributed SDN controller to facilitate operation of a second virtual network that includes one or more servers (306). For example, servers 34 of data center 132A may be configured to operate as control nodes 150C, 152C to generate instructions to use one or more optimal paths of route information to facilitate operation of vRouter 170C.

The first set of computing devices of data center 132A are configured to collect first reporting information from the first subcluster (308). For example, servers 34 of data center 132A may be configured to collect first reporting information from control nodes 150B, 152B. Examples of reporting information may include, but is not limited to, for example, (detailed) event records for every significant event in a system. As used herein, an event may refer to, for example, a User-Visible Entity (UVEs) update, new object creation, or another event. Servers 34 may output event records to one of multiple instances (e.g., for scale-out) of an analytics node that collate and store the information in a horizontally scalable database. The first set of computing devices of data center 132A are configured to collect second reporting information from the second subcluster (310). For example, servers 34 of data center 132A may be configured to collect second reporting information from control nodes 150C, 152C. The first set of computing devices of data center 132A are configured to generate analytics and database management using the first reporting information and the second reporting information (312). For example, servers 34 of data center 132A may be configured to generate global cluster configuration, contrail-analytics service, contrail-analytics-database service, etc. using the first reporting information and the second reporting information. For instance, servers 34 may, for example, collect, collate, and present analytics information for trouble shooting problems and for understanding network usage using the first reporting information and the second reporting information. In some instances, servers 34 may, for example, use a fault tolerant and horizontally scalable for persistent storage of analytics data.

The first set of computing devices and the second set of computing devices may be co-located in a first data center (e.g., data center 132A), and the one or more servers are located in a second data center different than the first data center. For example, the first set of computing devices and the second set of computing devices are co-located in data center 132A, and the one or more servers are located data center 132B. In some examples, however, the first set of computing devices may be located in a first data center and the first set of computing devices and the one or more servers are co-located in a second data center different than the first data center. For instance, the first set of computing devices may be located in data center 132A and the first set of computing devices and the one or more servers are co-located in data center 132B. In some examples, non-control functions may comprise a configuration function and analytics function.

The following describes provisioning a distributed compute cluster with subcluster. It may be possible to provision for remote compute using an instances.yaml file. Deploying a SDN controller cluster using SDN-controller-Command and instances.yml shows a bare minimum configuration. The YAML file described in this section builds upon that minimum configuration and uses FIG. 2 as an example data center network topology (e.g., Example Multi-Cluster Topology).

To configure remote compute in the YAML file:

First, create the remote locations or subclusters. In this example, created are data centers 2 and 3 (with the names pop1 and pop2, respectively), and define unique ASN numbers for each. Subcluster names may also be unique.

```
 1  remote_locations:
 2    pop1:
 3      BGP_ASN: 12345
 4      SUBCLUSTER: pop1
 5    pop2:
 6      BGP ASN: 12346
 7      SUBCLUSTER: pop2
 8  Create the control nodes for pop1 and pop2 and assign an IP address and role. These IP
       addresses are the local IP address. In this example, there are two control nodes for
       each subcluster.
 9        control_1_only_pop1:   # Mandatory. Instance name
10          provider: bms    # Mandatory. Instance runs on BMS
11          ip: 10.0.0.9
12          roles:
13             control:
14               location: pop1
15        control_2_only_pop1:   # Mandatory. Instance name
16          provider: bms    # Mandatory. Instance runs on BMS
17          ip: 10.0.0.10
18          roles:
19             control:
20               location: pop1
21        control_1_only_pop2:   # Mandatory. Instance name
22          provider: bms    # Mandatory. Instance runs on BMS
23          ip: 10.0.0.11
24          roles:    # Optional.
25             control:
26               location: pop2
27        control_2_only_pop2:   # Mandatory. Instance name
28          provider: bms    # Mandatory. Instance runs on BMS
29          ip: 10.0.0.12
30          roles:    # Optional.
31             control:
32               location: pop2
33        Now, create the remote compute nodes for pop1 and pop2 and assign an IP address
          and role. In this example, there are two remote compute nodes for each data center.
          The 10.60.0.x addresses are the management IP addresses for the control service.
34        compute_1_pop1:    # Mandatory. Instance name
35          provider: bms    # Mandatory. Instance runs on BMS
36          ip: 10.20.0.5
37          roles:
38             openstack_compute:    # Optional.
39             vrouter:
40                CONTROL_NODES: 10.60.0.9,10.60.0.10
41                VROUTER_GATEWAY: 10.70.0.1
42                location: pop1
43        compute_2_pop1:    # Mandatory. Instance name
44          provider: bms    # Mandatory. Instance runs on BMS
45          ip: 10.20.0.6
46          roles:
47             openstack_compute:    # Optional.
48             vrouter:
49                CONTROL_NODES: 10.60.0.9,10.60.0.10
50                VROUTER_GATEWAY: 10.70.0.1
51                location: pop1
52        compute_1_pop2:    # Mandatory. Instance name
53          provider: bms    # Mandatory. Instance runs on BMS
54          ip: 10.30.0.5
55          roles:
56             openstack_compute:    # Optional.
57             vrouter:
58                CONTROL_NODES: 10.60.0.11,10.60.0.12
59                VROUTER_GATEWAY: 10.80.0.1
60                location: pop2
61        compute_2_pop2:    # Mandatory. Instance name
62          provider: bms    # Mandatory. Instance runs on BMS
63          ip: 10.30.0.6
64          roles:
65             openstack_compute:    # Optional.
66             vrouter:
67                CONTROL_NODES: 10.60.0.11,10.60.0.12
68                VROUTER_GATEWAY: 10.80.0.1
69                location: pop2
```

The entire YAML file is contained below.
Example instance.yaml With Subcluster Configuration

```yaml
zoom_out_map
provider_config:
  bms:
    ssh_pwd: <password>
    ssh_user: <root user>
    ntpserver: 10.84.5.100
    domainsuffix: local
instances:
  openstack_node:                         # Mandatory. Instance name
    provider: bms                         # Mandatory. Instance runs on BMS
    ip: 10.0.0.4
    roles:                                # Optional.
      openstack:
  all_contrail_roles_default_pop:         # Mandatory. Instance name
    provider: bms                         # Mandatory. Instance runs on BMS
    ip: 10.0.0.5
    roles:                                # Optional.
      config_database:                    # Optional.
      config:                             # Optional.
      control:                            # Optional.
      analytics_database:                 # Optional.
      analytics:                          # Optional.
      webui:                              # Optional.
  compute_3_default_pop:                  # Mandatory. Instance name
    provider: bms                         # Mandatory. Instance runs on BMS
    ip: 10.0.0.6
    roles:
      openstack_compute:
      vrouter:
        VROUTER_GATEWAY: 10.60.0.1
  compute_1_default_pop:                  # Mandatory. Instance name
    provider: bms                         # Mandatory. Instance runs on BMS
    ip: 10.0.0.7
    roles:
      openstack_compute:
      vrouter:
        VROUTER_GATEWAY: 10.60.0.1
  compute_2_default_pop:                  # Mandatory. Instance name
    provider: bms                         # Mandatory. Instance runs on BMS
    ip: 10.0.0.8
    roles:
      openstack_compute:
      vrouter:
        VROUTER_ GATEWAY: 10.60.0.1
  control_1_only_pop1:                    # Mandatory. Instance name
    provider: bms                         # Mandatory. Instance runs on BMS
    ip: 10.0.0.9
    roles:
      control:
        location: pop1
  control_2_only_pop1:                    # Mandatory. Instance name
    provider: bms                         # Mandatory. Instance runs on BMS
    ip: 10.0.0.10
    roles:
      control:
        location: pop1
  control_1_only_pop2:                    # Mandatory. Instance name
    provider: bms                         # Mandatory. Instance runs on BMS
    ip: 10.0.0.11
    roles:                                # Optional.
      control:
        location: pop2
  control_2_only_pop2:                    # Mandatory. Instance name
    provider: bms                         # Mandatory. Instance runs on BMS
    ip: 10.0.0.12
    roles:                                # Optional.
      control:
        location: pop2
  compute_1_pop1:                         # Mandatory. Instance name
    provider: bms                         # Mandatory. Instance runs on BMS
    ip: 10.20.0.5
    roles:
      openstack_compute:                  # Optional.
      vrouter:
        CONTROL_NODES: 10.60.0.9,10.60.0.10
        VROUTER_GATEWAY: 10.70.0.1
        location: pop1
```

```
    compute_2_pop1:                    # Mandatory. Instance name
       provider: bms                   # Mandatory. Instance runs on BMS
       ip: 10.20.0.6
       roles:
          openstack_compute:           # Optional.
          vrouter:
             CONTROL_NODES: 10.60.0.9,10.60.0.10
             VROUTER_GATEWAY: 10.70.0.1
             location: pop1
    compute_1_pop2:                    # Mandatory. Instance name
       provider: bms                   # Mandatory. Instance runs on BMS
       ip: 10.30.0.5
       roles:
          openstack_compute:           # Optional.
          vrouter:
             CONTROL_NODES: 10.60.0.11,10.60.0.12
             VROUTER_GATEWAY: 10.80.0.1
             location: pop2
    compute_2_pop2:                    # Mandatory. Instance name
       provider: bms                   # Mandatory. Instance runs on BMS
       ip: 10.30.0.6
       roles:
          openstack_compute:           # Optional.
          vrouter:
             CONTROL_NODES: 10.60.0.11,10.60.0.12
             VROUTER_GATEWAY: 10.80.0.1
             location: pop2
global_configuration:
    CONTAINER_REGISTRY: 10.84.5.81:5000
    REGISTRY_PRIVATE_INSECURE: True
contrail configuration:                # Contrail service configuration section
    CONTRAIL_VERSION: ocata-5.0-35
    CONTROLLER_NODES: 10.60.0.5
    CLOUD_ORCHESTRATOR: openstack
    KEYSTONE_AUTH_HOST: 10.60.0.100
    KEYSTONE_AUTH_URL_VERSION: /v3
    RABBITMQ_NODE_PORT: 5673
    PHYSICAL_INTERFACE: eth1
    CONTROL_DATA_NET_LIST: 10.60.0.0/24,10.70.0.0/24,10.80.0.0/24
kolla_config:
    kolla_globals:
       network_interface: "eth1"
       enable_haproxy: "yes"
       contrail_api_interface_address: 10.60.0.5
       kolla_internal_vip_address: 10.60.0.100
       kolla_external_vip_address: 10.0.0.100
       kolla_external_vip_interface: "eth0"
    kolla_passwords:
       keystone_admin_password: <password>
remote_locations:
    pop1:
       BGP_ASN: 12345
       SUBCLUSTER: pop1
    pop2:
       BGP_ASN: 12346
       SUBCLUSTER: pop2
```

The following describes some additional example implementation conditions. For some use-case details, the architecture in FIG. 2 depicts Routing Cluster ID configuration for a network composed of 1 primary POP where the Control Cluster is deployed and 2 secondary POPs (POP1 and POP2) where remote computes are deployed. For analytics, reporting, and troubleshooting information, Routing Cluster-ID attribute needs to be added to all relevant User-Visible Entity (UVEs) associated with Control Node, vRouters, and BGP Routers, there may be a new cluster monitoring dashboard, there may be creation of a new dashboard aggregating all data from a given cluster. This may remove the need to go to three different sections in user interfaces (UIs).

For provisioning and orchestration, Cluster-ID provisioning may be available via application program interface (API)—Orange may use Virtual Network Controller (VNC) API for provisioning, and Cluster-ID Provisioning may be available via Heat. For High Availability (HA) and upgrades, HA should be part of the controller HA scope. There may not be specific work needed to support HA. The example techniques may work transparently during. In Service Software Upgrade (ISSU) upgrade.

For security and compliance, no extra security, encryption or compliance may be needed. For scale and performance metrics, this feature should not introduce any noticeable throughput performance degradation, when Compute Nodes are deployed remotely, Remote Compute may work with a latency of 20 milliseconds (msec) between Control Nodes and vRouter, 2 DC GWs/Remote POP, Max 20 Remote POPs/Config/Analytics/DB Cluster, and Max 50 Computes/Control node pair (typical 10-20).

As noted above, the alternate solutions may be cumbersome, where each cluster is an independent stand-alone cluster and federated but posing management challenges.

For API schema changes, a new object subcluster is created which takes a list of links to local compute nodes represented as vRouter objects and list of links to local control nodes represented as BGP router objects, and an ASN as property. Each of these subcluster object may represent a remote site.

For UI changes, there may be various examples of UI changes. As one example, UI needs to show list of subcluster objects. When a subcluster is selected, the UI should show a list of associated vRouters and BGP routers local in that remote site and the ASN property. As one example, UI may show a list of subcluster objects. While listing vRouters and BGP routers, the UR may provide a subcluster dropbox list, which may filter these objects based on a selected subcluster object. In some examples, the UI would may implement a new column against a list of vRouters and BGP-routers.

The following is code for an example implementation.
New Schema

```
+<xsd:element name="subcluster" type="ifmap:IdentityType"/>
+<xsd:element name="subcluster-asn" type="AutonomousSystemType"/>
+<!--#IFMAP-SEMANTICS-IDL
+    Property('subcluster-asn', 'subcluster', 'required', 'CRUD',
+        'AS number of that cluster.') -->
+
+<xsd:element name="virtual-router-subcluster"/>
+<!--#IFMAP-SEMANTICS-IDL
+    Link('virtual-router-subcluster',
+       'virtual-router', 'subcluster', ['ref'], 'optional', 'CRUD',
+       'Reference to subcluster in virtual-router.') -->
+
+<xsd:element name="bgp-router-subcluster"/>
+<!--#IFMAP-SEMANTICS-IDL
+    Link('bgp-router-subcluster',
+       'bgp-router', 'subcluster', ['ref'], 'optional', 'CRUD',
+       'Reference to subcluster in bgp-router') -->
+
```

Phase 1:
As part of phase 1,
1. The above schema implementation would be done.
2. Provision script to provision subcluster.
3. vRouter and BGP-router provision scripts may be modified to take a subcluster as an optional argument to link and/or delink them with subcluster object.
4. New API may be implemented in api-lib to CRUD subcluster, and they would be used by new provisioning scripts.
5. API server changes to handle the above requests and CRUD subcluster object with the links and properties defined above.

Remote-Site Cross Connect Verification
Cross subcluster site verification between compute and control nodes.

To catch any cross site connections between compute-node and control-node, control-node may verify against the xmlns attribute in XMPP open message to accept or reject connections.

```
<stream:stream
    from='juliet@im.example.com'
    to='im.example.com'
    version'1.0'
    xml:lang='en'
    xmlns='subcluster-id'
    xmlns:stream='http://etherx.jabber.org/streams'>
</stream:stream>
</>
```

In this example, both control-node and compute-node will be configured with subcluster string parameter in their respective configuration files.

As BGP peers are statically configured, verification is possible while processing configuration. Subcluster control nodes may be created as external-control-nodes.

As long as the remote sites are connected via Local Area Network (LAN) like latency, the forwarding plane performance may not be impacted. Also, upgrade and primary and subcluster may not be done independently with the current ISSU semantics. One example way to address this is:
1. Spawn new version controller software with respective services in parallel to existing services in both the clusters.
2. Point all the compute node analytics connectivity to the new version software in the primary cluster.
3. Create a iBGP mesh among old and newer version control nodes with in the cluster.
4. Upgrade compute nodes in the primary cluster and subclusters as how it is done today and point them to the respective local control nodes in that cluster.
5. Once all the compute nodes are upgraded, follow the existing procedure of ISSU on the primary cluster.
6. Follow similar procedure for the rollback. However, if the direct communication between old and new version of applications is relaxed, both cluster could be upgraded independently.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

Various examples have been described. These and other examples are within the scope of the following claims.

The invention claimed is:

1. A method comprising:
   executing, by a set of compute nodes, a first subcluster that includes a first set of one or more control nodes and a second subcluster that includes a second set of one or more control nodes;
   executing, by the set of compute nodes, the first set of one or more control nodes to exchange first route information, between a first gateway router and a second gateway router associated with the first set of one or more control nodes, for establishing one or more first virtual networks between first computing devices within a first data center that includes the second gateway router;
   executing, by the set of compute nodes, the second set of one or more control nodes to exchange second route information, between the first gateway router and a third gateway router associated with the second set of one or more control nodes, for establishing one or more second virtual networks between second computing devices within a second data center that includes the third gateway router; and
   wherein no control node of the first set of one or more control nodes is configured to exchange any route information with any control node of the second set of one or more control nodes.

2. The method of claim 1, wherein the first set of one or more control nodes is represented as border gateway protocol (BGP) router objects with an autonomous system number (ASN) as property.

3. The method of claim 1, further comprising executing, by the set of compute nodes, the first set of one or more control nodes to exchange the first route information for computing devices represented as virtual router objects.

4. The method of claim 1, further comprising executing, by the set of compute nodes, the first subcluster and the second subcluster to provide shared resources to facilitate operation of the one or more first virtual networks and the one or more second virtual networks.

5. The method of claim 4, wherein executing the first subcluster and the second subcluster comprises performing analytics operation for the one or more first virtual networks and the one or more second virtual networks.

6. The method of method 1, further comprising executing, by the set of compute nodes, the first set of one or more control nodes to border gateway protocol (BGP) peer with the second gateway router.

7. The method of claim 1, furter comprising executing, by the set of compute nodes, the first set of one or more control nodes to ulitize extensible messaging and presence protocol (XMPP) to exchange the first route information.

8. The method of claim 1, wherein a first control node of the first set of one or more control nodes and a second control node of the first set of one or more control nodes are configured to communicate using internal border gateway protocol (iBGP).

9. The method of claim 1, wherein the first subcluster and the second subcluster form at least part of a software defined networking (SDN) controller cluster.

10. A system comprising:
   a set of compute nodes configured to execute a first subcluster that includes a first set of one or more control nodes and a second subcluster that includes a second set of one or more control nodes;
   wherein the first set of one or more control nodes is configured to exchange first route information, between a first gateway router and a second gateway router associated with the first set of one or more control nodes, for establishing one or more first virtual networks between first computing devices within a first data center that includes the second gateway router;
   wherein the second set of one or more control nodes is configured to exchange second route information, between the first gateway router and a third gateway router associated with the second set of one or more control nodes, for establishing one or more second virtual networks between second computing devices within a second data center that includes the third gateway router; and
   wherein no control node of the first set of one or more control nodes is configured to exchange any route information with any control node of the second set of one or more control nodes.

11. The system of claim 10, wherein the first set of one or more control nodes is represented as border gateway protocol (BGP) router objects with an autonomous system number (ASN) as property.

12. The system of claim 10, wherein the first set of one or more control nodes is configured to exchange the first route information for computing devices represented as virtual router objects.

13. The system of claim 10, wherein the set of compute nodes is configured to execute the first subcluster and the second subcluster to provide shared resources to facilitate operation of the one or more first virtual networks and the one or more second virtual networks.

14. The method of claim 13, wherein to provide shared resources to facilitate operation of the one or more first virtual networks and the one or more second virtual networks, one or more compute nodes of the set of compute nodes is configured to perform analytics operation for the one or more first virtual networks and the one or more second virtual networks.

15. The system of claim 10, wherein the first set of one or more control nodes is configured to border gateway protocol (BGP) peer with the second gateway router.

16. The system of claim 10, wherein the first set of one or more control nodes is configured to utilize extensible messaging and presence protocol (XMPP) to exchange the first route information.

17. The system of claim 10, wherein a first control node of the first set of one or more control nodes and a second control node of the first set of one or more control nodes are configured to communicate using internal border gateway protocol protocol (iBGP).

18. The system of claim 10, wherein the first subcluster and the second subcluster form at least part of a software defined networking (SDN) controller cluster.

19. A non-transitory computer-readable storage medium storing instructions thereon that when executed cause one or more compute nodes to:
execute a first subcluster that includes a first set of one or more control nodes and a second subcluster that includes a second set of one or more control nodes;
wherein the first set of one or more control nodes is configured to exchange first route information, between a first gateway router and a second gateway router associated with the first set of one or more control nodes, for establishing one or more first virtual networks between first computing devices within a first data center that includes the second gateway router;
wherein the second set of one or more control nodes is configured to exchange second route information between the first gateway router and a third gateway router for establishing one or more second virtual networks between second computing devices within a second data center that includes the third gateway router; and
wherein no control node of the first set of one or more control nodes is configured to exchange any route information with any control node of the second set of one or more control nodes.

* * * * *